(12) United States Patent
Haimes et al.

(10) Patent No.: US 11,257,081 B2
(45) Date of Patent: Feb. 22, 2022

(54) INTEGRATING A BLOCKCHAIN LEDGER WITH AN APPLICATION EXTERNAL TO THE BLOCKCHAIN LEDGER

(71) Applicant: Oracle International Corporation, Redwood Shores, CA (US)

(72) Inventors: David Joseph Haimes, Belmont, CA (US); Todd Jeffery Little, Palatine, IL (US)

(73) Assignee: Oracle International Corporation, Redwood Shores, CA (US)

( * ) Notice: Subject to any disclaimer, the term of this patent is extended or adjusted under 35 U.S.C. 154(b) by 251 days.

(21) Appl. No.: 15/974,513

(22) Filed: May 8, 2018

(65) Prior Publication Data

US 2019/0347658 A1 Nov. 14, 2019

(51) Int. Cl.
| | | |
|---|---|---|
| *G06Q 20/00* | (2012.01) | |
| *G06Q 20/40* | (2012.01) | |
| *G06Q 20/04* | (2012.01) | |
| *G06Q 20/22* | (2012.01) | |
| *H04L 9/06* | (2006.01) | |

(52) U.S. Cl.
CPC .......... *G06Q 20/401* (2013.01); *G06Q 20/04* (2013.01); *G06Q 20/223* (2013.01); *H04L 9/0637* (2013.01); *H04L 2209/38* (2013.01)

(58) Field of Classification Search
CPC .... G06Q 20/401; G06Q 20/223; G06Q 20/04; G06Q 40/02; G06Q 40/04; G06Q 20/3827; H04L 9/0637; H04L 2209/38; G06F 21/64
USPC ................ 705/16, 21; 380/44, 262
See application file for complete search history.

(56) References Cited

U.S. PATENT DOCUMENTS

| | | | | |
|---|---|---|---|---|
| 2018/0081787 | A1* | 3/2018 | Riddick | ................ G06Q 20/00 |
| 2018/0089683 | A1* | 3/2018 | Setty | ....................... H04L 63/12 |
| 2018/0096163 | A1* | 4/2018 | Jacques de Kadt | . G06Q 20/203 |
| 2018/0264347 | A1* | 9/2018 | Tran | ..................... A63B 71/145 |
| 2019/0205884 | A1* | 7/2019 | Batra | ................ G06Q 20/3827 |

OTHER PUBLICATIONS

Hyperledger Fabric, 2018.
Hyperledger Architecture, vol. II, Smart Contracts, 2018.
Hyperledger Architecture, vol. 1: Introduction to Hyperledger Business Blockchain Design Philosophy and Consensus, 2017.

* cited by examiner

Primary Examiner — Dante Ravetti
(74) Attorney, Agent, or Firm — Invoke

(57) ABSTRACT

Integrating a blockchain ledger with an application external to the blockchain ledger is disclosed. A first method determines a state, to be written to a blockchain ledger, based on a contract transaction. A second method determines a state, to be written to the blockchain ledger, based on an adapter transaction. The first method includes an invocation of the second method. The second method verifies whether the adapter transaction includes a particular set of information associated with a particular application. If the adapter transaction includes the particular set of information, then both the contract transaction and the adapter transaction are committed to the blockchain ledger. If the adapter transaction does not include the particular set of information, then neither the contract transaction nor the adapter transaction are committed to the blockchain ledger. The state determined based on the adapter transaction is used to update the particular application.

23 Claims, 7 Drawing Sheets

US 11,257,081 B2

INTEGRATING A BLOCKCHAIN LEDGER WITH AN APPLICATION EXTERNAL TO THE BLOCKCHAIN LEDGER

TECHNICAL FIELD

The present disclosure relates to blockchains. In particular, the present disclosure relates to integrating a blockchain ledger with an application external to the blockchain ledger.

BACKGROUND

Blockchain technology involves storing records in blocks over a distributed system of nodes.

Each block is linked to the preceding block through the use of a hash. Specifically, each block stores both the hash of the preceding block and the hash of itself. Any change in data within the block changes the hash. Hence, it is not possible to change the data of any block, without changing the data of all following blocks. The chain of blocks may be referred to as a "blockchain."

A blockchain is maintained by a large number of nodes. Each node stores the same version of the blockchain at any given time. Hence, it is not possible to change the data of any individual copy of the blockchain stored by a particular node, without changing all copies of the blockchain stored by the remaining nodes.

A smart contract includes a set of code that may be executed to perform a transaction using blockchain technology. The same smart contract is stored across multiple nodes. Hence, it is not possible to change the code of any individual copy of the smart contract stored by a particular node, without changing all copies of the smart contract stored by the remaining nodes.

Certain information may be relevant to both a blockchain and an application external to the blockchain. However, the blockchain and the application may be managed independently. The blockchain may perform a series of transactions. The application may perform operations without any awareness of the transactions. Hence, transactions occurring on the blockchain may need to be synchronized with the application.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
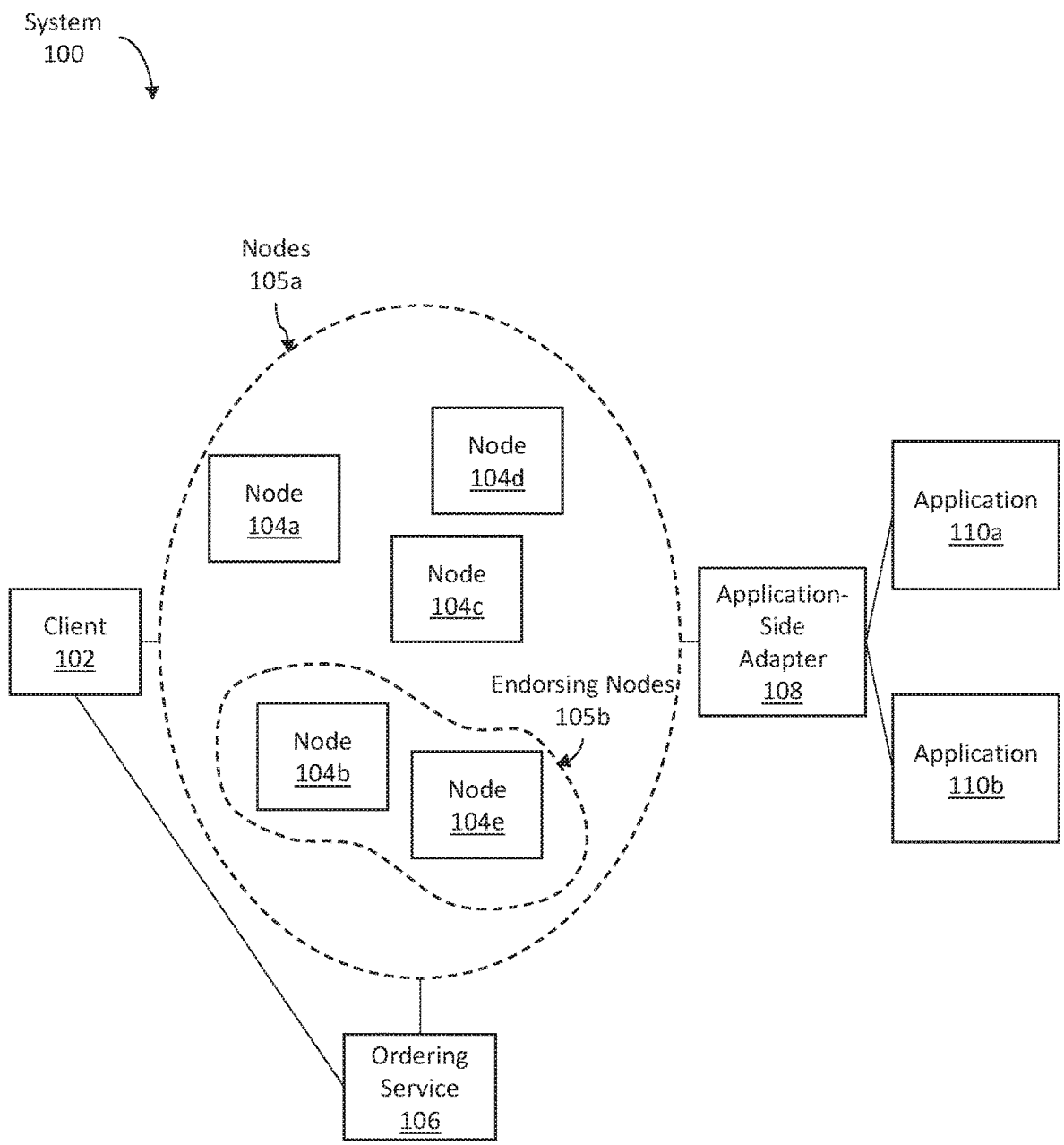
FIG. 1A illustrates a blockchain-application integration system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. BLOCKCHAIN-APPLICATION INTEGRATION SYSTEM ARCHITECTURE
3. INTEGRATING A BLOCKCHAIN AND AN APPLICATION EXTERNAL TO THE BLOCKCHAIN
4. ENDORSING A TRANSACTION TO BE WRITTEN TO A BLOCKCHAIN LEDGER AND INTEGRATED WITH AN APPLICATION
5. COMMITTING A TRANSACTION TO BE WRITTEN TO A BLOCKCHAIN LEDGER AND INTEGRATED WITH AN APPLICATION
6. UPDATING AN APPLICATION USING INFORMATION FROM A BLOCKCHAIN LEDGER
7. HARDWARE OVERVIEW
8. MISCELLANEOUS; EXTENSIONS

1. General Overview

Due to the nature of blockchain ledgers, transactions that have been committed on a blockchain ledger generally cannot be subsequently revised. There is no easy way to undo a committed transaction. The inability to alter committed transactions becomes problematic if the committed transactions cannot be validly integrated with a related application. As an example, an error may occur if two contract transactions are performed, but the two contract transactions result in a conflict in an application to be synchronized with the blockchain ledger. If there are errors during integration, there may be a need to perform a manual reconciliation between the blockchain ledger and the application. One or more embodiments determine that a transaction may be validly integrated with a particular application before committing the transaction to a blockchain ledger.

Each node that maintains a blockchain ledger includes both a smart contract and a blockchain-side adapter. A smart contract is a set of code that includes a contract simulation method for simulating a contract transaction. The contract simulation method determines a state, to be written to the blockchain ledger, based on the contract transaction.

A blockchain-side adapter is a type of smart contract used for integrating a blockchain ledger with a particular application. The blockchain-side adapter includes an adapter simulation method to simulate an adapter transaction. The adapter simulation method determines a state, to be written to the blockchain ledger, based on the adapter transaction.

The contract simulation method includes an invocation of the adapter simulation method. The adapter simulation method verifies whether the adapter transaction includes a particular set of information associated with a particular application. If the adapter transaction includes the particular set of information, then both the contract transaction and the adapter transaction are committed to the blockchain ledger. If the adapter transaction does not include the particular set of information, then neither the contract transaction nor the adapter transaction are committed to the blockchain ledger.

One or more embodiments determine a state, stored in a blockchain ledger, for updating an application. A node maintains a blockchain ledger that includes (a) states determined based on contract transactions and (b) states determined based on adapter transactions. The node publishes an event indicating that the blockchain ledger has been updated. Responsive to obtaining the event, a module associated with an application transmits a request, to the node, to read the blockchain ledger. Responsive to receiving the request to read the blockchain ledger, the node transmits one or more states stored in the blockchain ledger to the module. The module provides the states to the application. The application uses states determined based on adapter transactions to update the application. States determined based on adapter transactions are associated with statuses. A status associated with a state determined based on an adapter transaction indicate whether the state has been obtained by an application-side adapter, whether the state has been used to successfully update an application, and/or other information related to the process of integrating the blockchain ledger with the application.

An application may be interested in only certain types of transactions of a particular smart contract. However, a blockchain ledger may include transactions of multiple smart contracts. Based on one or more approaches described herein, an application need not look through the states corresponding to various transactions of multiple smart contract in a blockchain ledger. Rather, a blockchain-side adapter provides a separate set of states specifically for the application. The application-side adapter (and/or the application) may refer to the separate set of states, in the blockchain ledger, to determine the information necessary for updating the application.

A large number of nodes may maintain a blockchain ledger. If each node pushes information to be synchronized to an application, the application would obtain the information multiple times. Based on one or more approaches described herein, it would be sufficient for the application to pull the information to be synchronized from a single node.

One or more embodiments described in this Specification and/or recited in the claims may not be included in this General Overview section.

2. Blockchain-Application Integration System Architecture

FIG. 1A illustrates a blockchain-application integration system, in accordance with one or more embodiments. As illustrated in FIG. 1, a system 100 includes a client 102, a set of nodes 105a (such as, nodes 104a-e), an ordering service 106, an application-side adapter 108, and one or more applications 110a-b. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a client 102 requests a transaction, of a particular smart contract, to be written to a blockchain ledger. A process of requesting a transaction to be written may involve multiple phases. In a first phase, a client 102 proposes a transaction to a set of endorsing nodes 105b. In a second phase, a client 102 transmits the transaction to an ordering service 106, so that the transaction will be committed to a blockchain ledger.

In some cases, a client 102 is the same as an application (such as any of applications 110a-b). In other cases, a client 102 is different from any of applications 110a-b.

In one or more embodiments, a set of nodes 105a maintains a blockchain ledger. A set of nodes 105a commits transactions to the blockchain ledger. Additionally or alternatively, the set of nodes 105a stores states, corresponding to committed transactions, in the blockchain ledger. The transactions and/or states stored in a blockchain ledger may pertain to one or more smart contracts. A set of nodes 105a may maintain a blockchain ledger in accordance with a particular blockchain system or framework, such as Hyperledger Fabric. Additional details regarding the set of nodes 105a is described below with reference to FIG. 1B.

In one or more embodiments, at least a subset of the nodes 105a may be endorsing nodes 105b for a particular smart contract. An endorsing node (such as any of nodes 104b or 104e) endorses a transaction proposed by a client 102. A process of endorsing a transaction may involve multiple phases. In a first phase, an endorsing node simulates the transaction by determining a resulting state after performance of the transaction. In a second phase, an endorsing node generates a message including (a) the resulting state and (b) a signature of the endorsing node.

In one or more embodiments, an ordering service 106 generates and delivers blocks to be committed to a blockchain ledger. An ordering service 106 receives transactions to be committed from one or more clients 106. The ordering service 106 determines a particular order for the transactions. The ordering service 106 groups the ordered transactions into a block. The ordering service 106 determines a hash of the previously-generated block, and a hash of the currently-generated block. The ordering service 106 stores both hashes into the block. The ordering service 106 delivers the block to a set of nodes 105a for commitment.

In one or more embodiments, an application (such as any of applications 110a-b) is a software program that is external to the blockchain ledger. The application does not maintain the blockchain ledger. An application may be executed on one or more computing devices. An application may be executed in a cloud environment (such as a public cloud, a private cloud, or a hybrid cloud). In an embodiment, an application is not executed on any node (such as nodes 105a) that maintains a blockchain ledger.

In an embodiment, certain information is relevant to both a blockchain ledger (maintained by nodes 105a) and an application external to the blockchain ledger. As an example, there may be a marketplace for outstanding invoices. A corn farmer may sell corn to customers and issue invoices that are due 30 days after receipt. The corn farmer may choose to collect on an invoice himself, or sell the invoice on the marketplace to immediately obtain funds.

A set of nodes may include a smart contract for transferring ownership of outstanding invoices. The set of nodes may maintain a blockchain ledger indicating the owner of each outstanding invoice.

Meanwhile, the corn farmer may purchase a cloud service that manages the corn farmer's outstanding invoices. The cloud service performs collections actions for the outstanding invoices to collect from the corn farmer's customers.

In this example, information about who owns each outstanding invoice is relevant to both the blockchain ledger and the cloud service. Specifically, the blockchain ledger stores ownership information based on transactions, of the smart contract, that are performed on the set of nodes. Moreover, the cloud service performs collections actions on outstanding invoices owned by the corn farmer. The cloud service should not perform collections actions on outstanding invoices that have already been sold to another party.

In one or more embodiments, an application-side adapter 108 refers to a hardware and/or software module configured to perform operations described herein for integrating a blockchain ledger with one or more applications 110a-b. Examples of operations for integrating a blockchain ledger with an application are described below with reference to FIGS. 2-5.

In an embodiment, an application-side adapter 108 is authorized to access one or more applications 110a-b. As an example, an application-side adapter 108 may communicate with applications 110a-b. The application-side adapter 108 may write to the databases of the applications 110a-b.

In an embodiment, an application-side adapter 108 may be shared amongst multiple applications 110a-b. The application-side adapter 108 communicates with each of the applications 110a-b to update the applications 110a-b. In another embodiment, a separate application-side adapter 108 is dedicated to each of applications 110a-b.

An application-side adapter 108 works with a blockchain-side adapter to integrate a blockchain ledger and an application. Additional details regarding a blockchain-side adapter are described below with reference to FIG. 1B.

In an embodiment, each of a client 102, a node 104a-e, an ordering service 106, an application-side adapter 108, and/or an application 110a-b is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

Figure 1B:
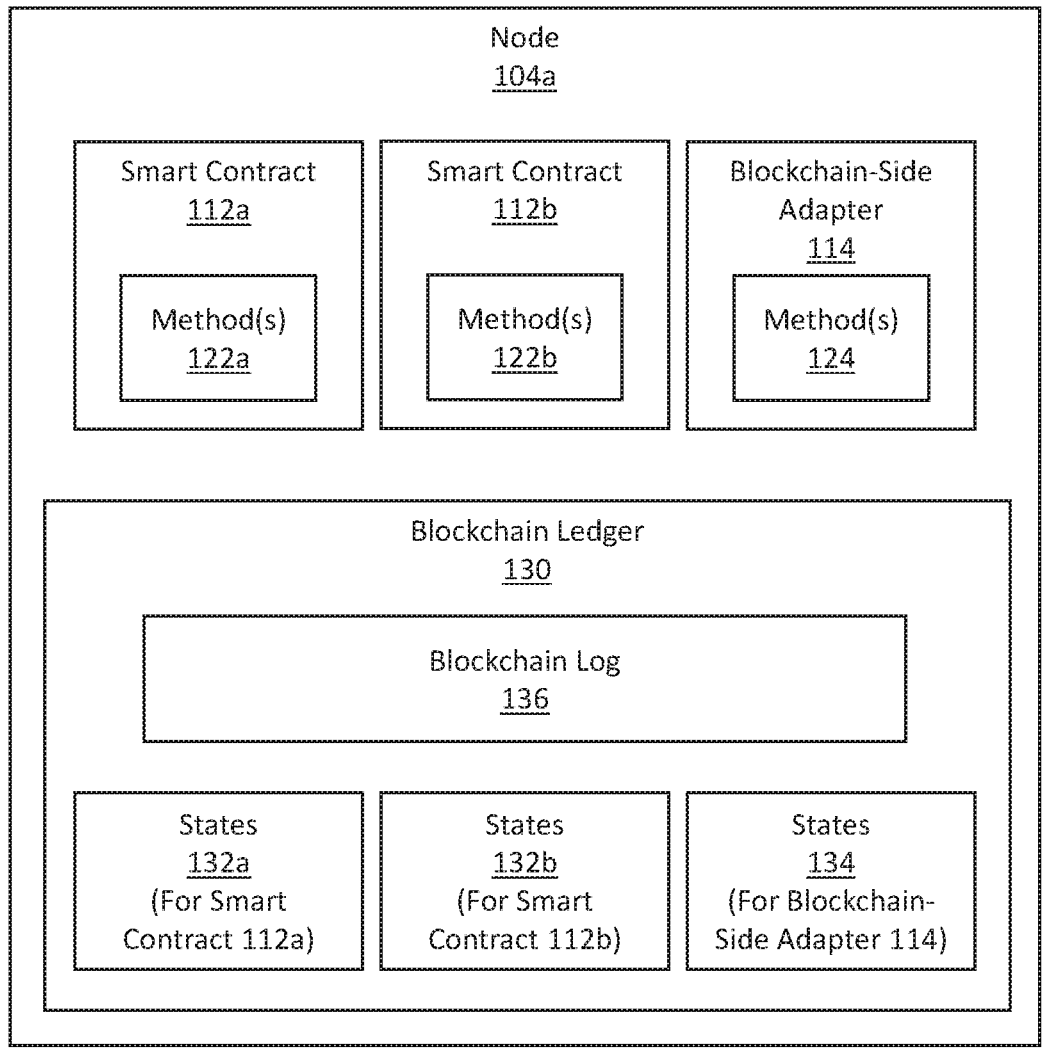
FIG. 1B shows a block diagram of a node that maintains a blockchain ledger, in accordance with one or more embodiments.

FIG. 1B shows a block diagram of a node that maintains a blockchain ledger, in accordance with one or more embodiments. As illustrated, a node (such as node 104a of FIG. 1A) includes one or more smart contracts 112a-b, a blockchain-side adapter 114, and a blockchain ledger 130. A blockchain ledger 130 includes a blockchain log 136, states 132a-b (associated with one or more smart contracts 112a-b), and states 134 (associated with the blockchain-side adapter 114).

In one or more embodiments, a smart contract (such as any of smart contracts 112a-b) is a set of code that includes one or more methods (such as any of methods 122a-b) that may be executed to perform a transaction using blockchain technology. The same smart contract is stored across multiple nodes (such as endorsing nodes 105b of FIG. 1A). A transaction to be performed, or performed, based on a smart contract may be referred to herein as a "contract transaction."

A method (such as any of methods 122a-b) of a smart contract includes operations for determining a new state, to be committed to a blockchain ledger 130, based on a contract transaction. Information associated with the contract transaction may be specified using parameters for the method. The method may perform operations upon a current state stored in the blockchain ledger 130. Executing the method to determine the new state, without committing the new state to the blockchain ledger 130, may be referred to herein as "simulating" the contract transaction. Once the new state is written or committed to the blockchain ledger 130, the contract transaction is considered as "performed" or "completed."

As an example, a current state in a blockchain ledger may indicate that Janet's account has 1,000 stocks in Boom Company. A contract transaction to be performed may be to add 500 stocks in Boom Company to Janet's account. A method for adding stocks to an account may be invoked. Parameters for the method may specify the number of stocks to be added (500) and the account at issue (Janet's account). The method may obtain the current state of Janet's account, which indicates that there are 1,000 stocks. The method may add the 500 stocks to the current state, resulting in 1,500 stocks. The method may return a new state, indicating that Janet's account would have 1,500 stocks based on the contract transaction. In this example, the contract transaction is simulated to determine that Janet's account would have 1,500 stocks based on the contract transaction.

In an embodiment, a smart contract includes code that represents terms agreed upon by two or more parties. As an example, one party may be a car seller. Another party may be a car buyer. The parties may agree to a price of $100,000. A smart contract may include a method for changing ownership of a car from the car seller to the car buyer. The method includes code that triggers the change of ownership if an amount of $100,000 is received by the car seller from the car buyer. Hence, the smart contract includes code that represents the agreed upon price of $100,000.

In one or more embodiments, a blockchain-side adapter 114 refers to a hardware and/or software module configured to perform operations described herein for integrating a blockchain ledger 130 with one or more applications 110a-b. Examples of operations for integrating a blockchain ledger with an application are described below with reference to FIGS. 2-5.

In an embodiment, a blockchain-side adapter 114 is a particular type of smart contract. A blockchain-side adapter 114 includes one or more methods 124 that may be executed to perform a transaction using blockchain technology. The same blockchain-side adapter 114 is stored across multiple nodes (such as endorsing nodes 105b of FIG. 1A). A transaction to be performed, or performed, based on a blockchain-side adapter 114 may be referred to herein as an "adapter transaction."

An adapter transaction is a transaction that updates one or more states, in a blockchain ledger 130, for integration or synchronization with an application (such as any of applications 110a-b).

A method 124 of a blockchain-side adapter includes operations for determining a new state, to be committed to a blockchain ledger 130, based on an adapter transaction. Information associated with the adapter transaction may be specified using parameters for the method. The method may perform operations upon a current state stored in the blockchain ledger 130. The new state includes information to be synchronized with a particular application. The new state is to be used for updating the particular application.

Additionally or alternatively, a method 124 of a blockchain-side adapter includes operations for verifying whether an adapter transaction includes sufficient information for a particular application that is to be integrated with a blockchain ledger 130. If the adapter transaction does not include sufficient information, then the method may generate an error.

As an example, a particular application may maintain a certain set of fields or attributes in a database. A method of a blockchain-side adapter includes operations verifying whether an adapter transaction includes sufficient information for updating the values of the fields or attributes of the database maintained by the particular application. If a value for a particular field is missing or indeterminate, then the method may return an error.

As another example, a department of motor vehicles may use a smart contract to manage cars licensed for operation in a particular province. States, associated with the smart contract, store the following information associated with a car: make, model, year, color, identification number, owner, and owner's address.

Meanwhile, a census agency may use a statistics application to run statistics for the particular province. The census agency may use the statistics application to determine a number of cars in each city within the particular province. The information needed by the statistics application may include the owner's address. However, there is no need for the statistics application to know the owner of the car.

A blockchain-side adapter may be used to integrate the blockchain ledger with the statistics application. A method, of the blockchain-side adapter, may be configured to verify whether an adapter transaction includes information identifying the owner's address of a car. If the owner's address is included, then the method is executed such that a state is updated with the owner's address. The state may be used for updating the statistics application.

In an embodiment, a blockchain-side adapter 114 may be used for integrating states of multiple smart contracts 112*a-b* with multiple applications 110*a-b*. Multiple smart contracts 112*a-b* may include code that invokes a method of the blockchain-side adapter 114 to determine a new state in the blockchain ledger 130. New states determined by a method of the blockchain-side adapter 114 may be used by multiple applications to update the multiple applications.

In one or more embodiments, a blockchain ledger 130 includes a blockchain log 136 and/or a record of states (such as states 132*a-b* and/or states 134).

A blockchain log 136 stores transactions that have been committed stored in a blockchain. The transactions may be performed based on one or more smart contracts 112*a-b*. Additionally or alternatively, the transactions may be performed based on a blockchain-side adapter 114. As described above, each block is linked to the preceding block through the use of a hash. Specifically, each block stores both the hash of the preceding block and the hash of itself.

A record of states stores states determined based on committed transactions. As illustrated, for example, states 132*a* are determined based on committed transactions of smart contract 112*a*; states 132*b* are determined based on committed transactions of smart contract 112*b*; and states 134 are determined based on committed transactions of blockchain-side adapter 114. In an embodiment, state created and/or modified by a particular smart contract is scoped exclusively to that particular smart contract. The state cannot be accessed directly by another smart contract. However, given the appropriate permissions, a particular smart contract may invoke another smart contract to access a state associated with the other smart contract.

States may be stored using any of a variety of data structures, such as key-value pairs. Each state may be associated with a version identifier. Each time a state is modified, the associated version identifier is incremented.

As an example, a record of states, of a blockchain ledger, may initially indicate the amount of money owned by John and the amount of money owned by Mary. The record of states may include: "Key: John; Value: $100, version 12" and "Key: Mary; Value: $300, version 53." A transaction may be performed on Jan. 1, 2018, to transfer $50 from Mary to John. A blockchain log, of the blockchain ledger, may be updated to include the transaction: "Jan. 1, 2018; from Mary; to John; $50." The record of states may be updated to include: "Key: John; Value: $150, version 13" and "Key: Mary; Value: $250, version 54."

In an embodiment, states 134 (associated with a blockchain-side adapter 114) includes information that is used to update an application. Further, each of states 134 is associated with a status relevant to the integration of the blockchain ledger 130 and the application. For example, a status may indicate that a state 134 has not yet been obtained by the application, another status may indicate that a state 134 has been successfully obtained by the application, and another status may indicate that a state 134 has been successfully used to update an application.

In one or more embodiments, a data repository (not illustrated) is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site.

A data repository may store information describing one or more smart contracts 112*a-b*, a blockchain-side adapter 114, and a blockchain ledger 130. A data repository may be implemented or may execute on the same computing system as a node 104*a*. Alternatively or additionally, a data repository may be implemented or executed on a computing system separate from a node 104*a*. The data repository may be communicatively coupled to the node 104*a* via a direct connection or via a network.

3. Integrating a Blockchain and an Application External to the Blockchain

Figure 2:
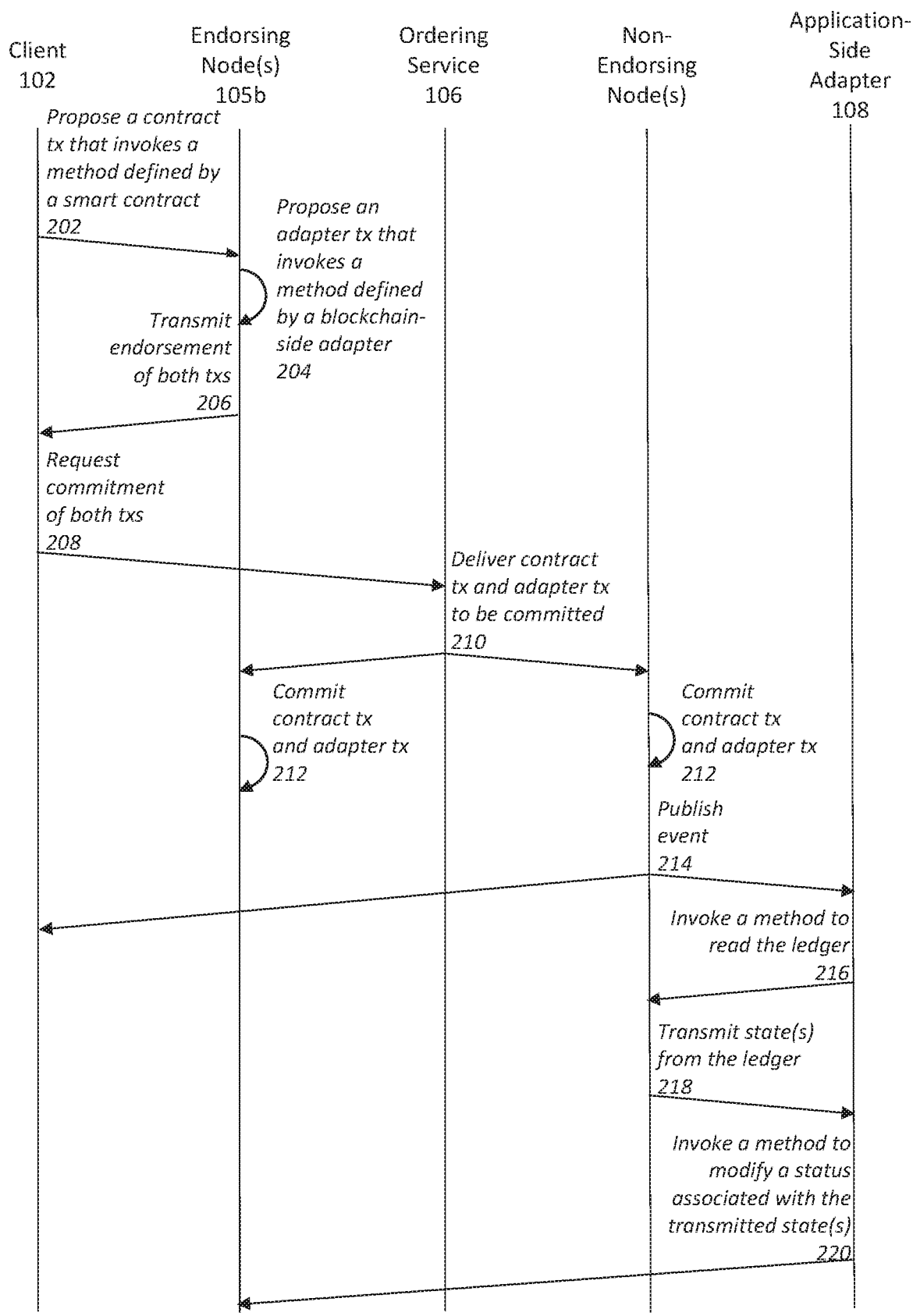
FIG. 2 illustrates an example set of operations for integrating a blockchain and an application external to the blockchain, in accordance with one or more embodiments.

FIG. 2 illustrates an example set of operations for integrating a blockchain and an application external to the blockchain, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments. Same components across FIGS. 1A-2 are labeled with the same numbers.

In one or more embodiments, a client 102 proposes a contract transaction that invokes a method defined by a smart contract (Operation 202). The client 102 sends a message that includes (a) an identifier of the method and (b) parameters for the method. The parameters for the method includes information associated with the contract transaction. The client 102 sends the message to one or more endorsing nodes 105*b*.

As an example, a blockchain ledger may maintain information about an inventory of a car dealership. The car dealership may receive a shipment of a new car for sale. A manager of the car dealership may use a client to add the new car to the blockchain ledger. The client may propose a contract transaction to add the new car. The client's message may include an identifier of a method that adds a new car. The client's message may include parameters for the method, including: an identifier, make, model, and year of the new car. The identifier of the new car may serve as a new key in the record of states maintained in the blockchain ledger. The client may transmit the message to a set of endorsing nodes.

As another example, a blockchain ledger may maintain information about an inventory of a car dealership. The car dealership may sell a car to Daphne. A salesperson of the car dealership may use a client to update a blockchain ledger to change the ownership of the car from the car dealership to Daphne. The client may propose a contract transaction that changes car ownership. The client's message may include an identifier of a method that changes car ownership. The client's message may include parameters for the method, including: an identifier of the car, and the name of the new owner. The identifier of the car is used as a key into a record of states in the blockchain ledger, so that values associated with the key may be modified. The client may transmit the message to a set of endorsing nodes.

In one or more embodiments, a set of one or more endorsing nodes 105*b* proposes an adapter transaction that invokes a method defined by a blockchain-side adapter (Operation 204). Triggered by the invocation of the method at Operation 202, the endorsing nodes 105*b* (and/or another component) propose the adapter transaction. Various ways of invoking the method defined in the blockchain-side adapter may be used, as further described below.

In an embodiment, the method defined in the smart contract includes a command to invoke the method defined in the blockchain-side adapter. Hence, execution of the method defined by the smart contract includes invoking the method defined by the blockchain-side adapter.

In another embodiment, a monitoring service monitors the invocation and/or execution of methods on an endorsing node 105*b*. Responsive to detecting that the method defined by the smart contract is invoked and/or executed, the monitoring service generates a command to invoke the method defined in the blockchain-side adapter. Hence, invoking and/or executing the method defined by the smart contract triggers invocation of the method defined by the blockchain-side adapter.

The client 102 need not invoke the method defined by the blockchain-adapter. The client 102 may not be aware of the invocation of the method defined by the blockchain-adapter.

A command to invoke the method defined by the blockchain-side adapter includes (a) an identifier of the method and (b) parameters for the method. The parameters for the method include information associated with the adapter transaction. The method includes various operations, including: (a) verifying that the adapter transaction includes a set of information associated with a particular application, and (b) determining a new state, to be written to the blockchain ledger, based on the adapter transaction. The new state is used to update an application external to the blockchain ledger.

As an example, a blockchain ledger may maintain information about an inventory of a car dealership. An advertising application may be used to produce advertisements about cars in an inventory of a car dealership. The advertising application may need information about the make, model, and year of a car in order to produce an advertisement for the car.

Continuing the example, a client may propose a contract transaction to add a new car to the blockchain ledger. The client may invoke a method defined by a smart contract that adds a new car. Responsive to the client's proposal, an endorsing node may execute the method defined by the smart contract. The method defined by the smart contract may simulate the contract transaction to determine a state, in the blockchain ledger, that represents the addition of the new car to the inventory. The method defined by the smart contract may also include a command to invoke a method defined by a blockchain-side adapter, and parameters therefor. The parameters may include information associated with an adapter transaction. Based on the execution of the method defined by the smart contract, the endorsing node may invoke the method defined by the blockchain-side adapter.

Continuing the example, the method defined by the blockchain-side adapter may verify that the adapter transaction includes the information needed by the advertising application (that is, the make, model, and year of the new car). The method defined by the blockchain-side adapter may also simulate the adapter transaction to determine a state, in the blockchain ledger, that represents information to be synchronized with the advertising application. The information to be synchronized with the advertising application includes the make, model, and year of the new car.

In one or more embodiments, the endorsing nodes 105*b* transmit an endorsement of both the contract transaction and the adapter transaction (Operation 206). Various ways of endorsing transactions may be used.

In an embodiment, each endorsing node 105*b* executes both the method defined in the smart contract and the method defined in the blockchain-side adapter. Each endorsing node 105*b* executes the method defined in the smart contract based on (a) the parameters of the method defined in the smart contract and/or (b) a current state associated with the smart contract. Hence, each endorsing node 105*b* determines a state based on the contract transaction. The contract transaction is considered as "simulated."

Further, each endorsing node 105*b* executes the method defined in the blockchain-side adapter based on (a) the parameters of the method defined in the blockchain-side adapter and/or (b) a current state associated with the blockchain-side adapter. Hence, each endorsing node 105*b* determines a state based on the adapter transaction. The adapter transaction is considered as "simulated."

Each endorsing node 105*b* generates a message that includes (a) the contract transaction, (b) the adapter transaction, (c) the state determined based on the contract transaction, and (d) the state determined based on the adapter transaction. The message may also include the current state associated with the smart contract, and the current state associated with the blockchain-side adapter. Each endorsing node 105*b* signs the message with a signature of the endorsing node 105*b*. Each endorsing node 105*b* transmits the message to the client 102. The message constitutes an endorsement, from a particular endorsing node 105*b*, of both the contract transaction and the adapter transaction.

As an example, a blockchain ledger may maintain information about an inventory of a car dealership. An advertising application may be used to produce advertisements about cars in an inventory of a car dealership. The advertising application may need information about the make, model, and year of a car in order to produce an advertisement for the car.

Continuing the example, a client may propose a contract transaction to add a new car to the blockchain ledger. The client may invoke a method defined by a smart contract that adds a new car. The method defined by the smart contract may include a command to invoke a method defined by a blockchain-side adapter.

An endorsing node may execute both the method defined by the smart contract and the method defined by the blockchain-side adapter. By executing the method defined by the smart contract, the endorsing node determines a state that represents the addition of the new car to the inventory. For example, the state may be: "Key: ID 123, Value: Toyota, Camry, 2018, Blue, Dealership, version 1." By executing the method defined by the blockchain-side adapter, the endorsing node determines a state that represents information to be synchronized with the advertising application. For example, the state may be: "Key: ID 123, Value: Toyota, Camry, 2018, Not Obtained by Application, version 1." The information "Not Obtained by Application" is a status associated with the state. The information "Not Obtained by Application" indicates that the state still needs to be synchronized with the advertising application.

The endorsing node may generate a message that includes both the state determined based on the contract transaction and the state determined based on the adapter transaction. The endorsing node may sign the message. The endorsing node may transmit the message to the client.

Other endorsing nodes may perform the same operations, thereby transmitting respective endorsements to the client.

As another example, a client may propose a contract transaction for transferring the ownership of a car from Elizabeth to Sean, based on a smart contract agreed upon by Elizabeth and Sean. A current state associated with the smart contract may indicate that Elizabeth is the owner. The current state may include: "Key: ID 542; Value: Toyota, Camry, 2018, Blue, Elizabeth, version 42." An endorsing node may execute a method to determine a state based on the contract transaction. The new state may indicate that Sean is the owner. The new state may include: "Key: ID 542; Value: Toyota, Camry, 2018, Blue, Sean, version 43." The method may also invoke another method, defined by a blockchain-side adapter, to determine a state based on an adapter transaction.

A current state associated with the blockchain-side adapter may include: "Key: ID 542; Value: Toyota, Camry, 2018, Elizabeth, version 55." The endorsing node may execute the other method to determine a state based on the adapter transaction. The new state may include: "Key: ID 542; Value: Toyota, Camry, 2018, Sean, version 56."

The endorsing node generate a message that includes (a) the current state associated with the smart contract, (b) the current state associated with the blockchain-side adapter, (c) the new state determined based on the contract transaction, and (d) the new state determined based on the adapter transaction. The endorsing node may sign the message. The endorsing node may transmit the message to the client.

In one or more embodiments, the client 102 requests commitment of both the contract transaction and the adapter transaction (Operation 208). Various ways of requesting commitment may be used.

In an embodiment, the client 102 receives an endorsement from the endorsing nodes 105b. The endorsement includes the state determined based on the contract transaction and the state determined based on the adapter transaction. The client 102 determines whether endorsements from a sufficient number of endorsing nodes 105b have been received. If sufficient endorsements are received, the client 102 transmits the endorsements to an ordering service 106. Transmission of the endorsements to the ordering service 106 constitutes a request to commit the contract transaction and the adapter transaction.

In one or more embodiments, an ordering service 106 delivers a set of transactions, including the contract transaction and the adapter transaction, to be committed (Operation 210). Various ways of delivering transactions for commitment may be used. In an embodiment, the ordering service 106 receives endorsements for various transactions from various clients, including the endorsement of the contract transaction and the adapter transaction from the client 102. The ordering service 106 determines a particular ordering of the various transactions. The ordering service 106 groups the ordered transactions into a block. The ordering service 106 determines a hash of a preceding block and a hash of the current block. The ordering service 106 adds the two hashes to the block. The ordering service 106 delivers the block of transactions, as well as corresponding states, to a set of nodes 105a for commitment. The set of nodes 105a may include the endorsing nodes 105b.

In one or more embodiments, a set of nodes 105a commits the set of transactions, including the contract transaction and the adapter transaction (Operation 212). Various ways of committing transactions may be used. In an embodiment, each node receives a block of transactions from the ordering service 106. Each node performs various verifications on the block of transactions. As an example, a node verifies whether each transaction in the block is associated with a sufficient number of endorsements. A node verifies whether each endorsement is properly signed by an endorsing node. A node verifies whether any state has changed since the simulation and/or endorsement of each transaction. If all necessary verifications are satisfied, then each node updates the copy of the blockchain ledger maintained by that node. Each node writes the block received from the ordering service to the blockchain log. Each node updates the record of states using the states received from the ordering service. Hence, the same information is written to every copy of the blockchain ledger maintained by each of the set of nodes 105a. Writing information to a blockchain ledger constitutes committing the information to the blockchain ledger.

In one or more embodiments, one or more nodes 105a publish an event indicating that the set of transactions are committed (Operation 214). Various ways of publishing events, or providing notification about committed transactions, may be used.

In an embodiment, when a block is written to a blockchain ledger, a node publishes an event to an event stream. The event indicates that the block has been written. The event may but does not necessarily include all details of the transactions in the block and corresponding states. The publishing node may be any of the set of nodes 105a that maintains the blockchain ledger (including but not limited to the endorsing nodes 105b). An application may subscribe to the event stream of a particular node. Based on the subscription, the application obtains the event published by the particular node. Additionally or alternatively, a client 102 may subscribe to the event stream of a particular node. Based on the subscription, the client 102 obtains the event published by the particular node.

In another embodiment, a node may publish an event periodically. The event indicates the transactions that have been written since the last published event. In another embodiment, a node may publish an event if a transaction of a particular transaction type was committed. Other ways of providing notification about committed transactions may be used.

In one or more embodiments, an application-side adapter 108 invokes a method to read the blockchain ledger (Operation 216). Responsive to a notification that one or more transactions were committed, the application-side adapter 108 invokes a method to read the blockchain ledger. The application-side adapter 108 may transmit the command to read the blockchain ledger to any of the set of nodes 105a that maintains the blockchain ledger (including but not limited to the endorsing nodes 105b).

The application-side adapter 108 may request to read the entire blockchain ledger, or only the blockchain log, or only the record of states. The application-side adapter 108 may request to read all or a subset of transactions in the blockchain ledger. The application-side adapter 108 may request to read all or a subset of states in the blockchain ledger.

In one or more embodiments, a node transmits one or more states stored in the blockchain ledger to the application-side adapter 108 (Operation 218). Responsive to the request to read the blockchain ledger, the node transmits one or more states stored in the blockchain ledger to the application-side adapter 108. The transmitted states include (a) the state determined based on the contract transaction proposed at Operation 202 and (b) the state determined based on the adapter transaction proposed at Operation 204.

The application-side adapter 108 provides the states to an application. The application uses the states to update the application.

As an example, a blockchain ledger may maintain information about an inventory of a car dealership. An advertising application may be used to produce advertisements about cars in an inventory of a car dealership. The advertising application may need information about the make, model, and year of a car in order to produce an advertisement for the car.

Continuing the example, a state in a blockchain ledger may be updated to represent the addition of a new car to the inventory. Another state in the blockchain ledger may be updated to represent information to be synchronized with the advertising application (that is, the information associated with the new car). A node may publish an event to indicate that the two states have been written to the blockchain ledger. An application-side adapter may obtain the event. The application-side adapter may invoke a command to read the blockchain ledger. The node may transmit, to the application-side adapter, at least the state representing information to be synchronized with the advertising application. The state representing information to be synchronized with the advertising application may be: "Key: ID 123; Value: Toyota, Camry, 2018, Not Obtained by Application, version 1."

The application-side adapter may transmit the state to the application. The application may use the state to update the application. The application may add a new entry into a database based on the state. The new entry may state, "ID: 123; Make: Toyota; Model: Camry; Year: 2018." The application may use the new entry to produce an advertisement for the new car.

In one or more embodiments, the application-side adapter 108 invokes a method to modify a status associated with the transmitted state(s) (Operation 220). The application-side adapter 108 may set the status associated with the transmitted states to various values. The status may indicate that the application-side adapter 108 has successfully obtained the transmitted states. The status may be, for example, "Successfully Read." Additionally or alternatively, the the status may indicate that the application has successfully updated the application based on the transmitted states. The status may be, for example, "Successfully Updated Application."

The application-side adapter 108 invokes a method to modify a status by generating a message that includes (a) an identifier of the method and (b) parameters for the method. The method modifies the status associated with a particular state in the blockchain ledger. The parameters for the method indicates the value of the status to be assigned. The method may be defined by the blockchain-side adapter. The application-side adapter 108 transmits the message to one or more endorsing nodes 105b. The message constitutes a proposal of a transaction that modifies a status associated with a state.

The proposal of the transaction triggers a set of operations for committing the transaction. The endorsing nodes 105b endorse the transaction to modify the status. The application-side adapter 108 transmits the endorsements to the ordering service 106. The ordering service 106 delivers transactions to be committed, including the transaction to modify the status. The set of nodes 105a commit the transactions, including the transaction to modify the status.

Figure 3:
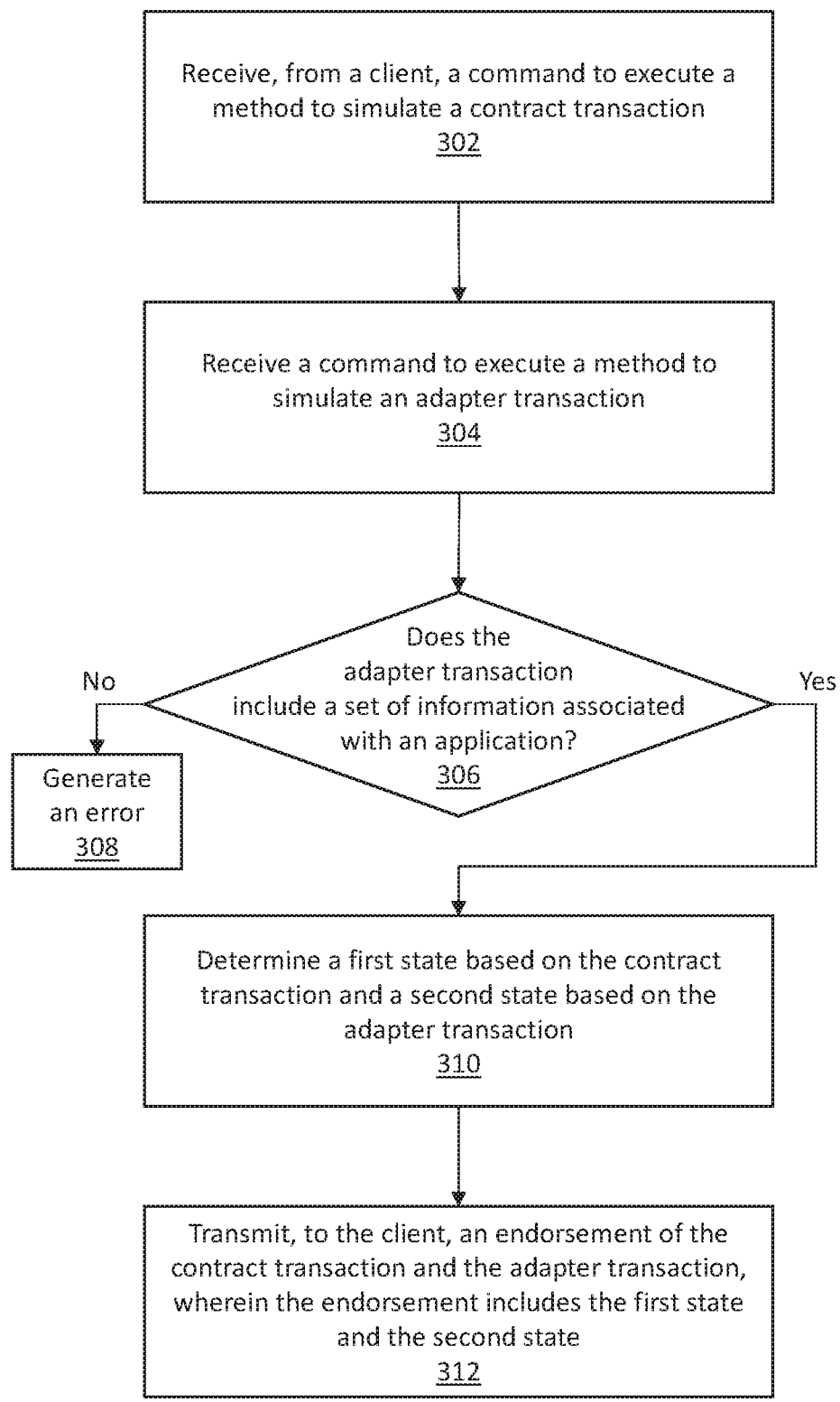
FIG. 3 illustrates an example set of operations for endorsing a transaction to be written to a blockchain ledger and integrated with an application, in accordance with one or more embodiments.

4. Endorsing a Transaction to be Written to a Blockchain Ledger and Integrated with an Application FIG. 3 illustrates an example set of operations for endorsing a transaction to be written to a blockchain ledger and integrated with an application. One or more operations illustrated in FIG. 3 may be modified, rearranged, or omitted all together. Accordingly, the particular sequence of operations illustrated in FIG. 3 should not be construed as limiting the scope of one or more embodiments. The operations of FIG. 3 may be performed by each of a set of endorsing nodes 105b.

One or more embodiments receive, from a client, a command to execute a method to simulate a contract transaction (Operation 302). An endorsing node 105b receives a command to execute a method to simulate a contract transaction. The command may specify parameters for the method. The parameters may include information associated with the contract transaction. The method includes operations for determining a state, to be written into a blockchain ledger, based on the contract transaction. The method may be defined by a smart contract. The command to simulate the contract transaction constitutes a proposal of the contract transaction from a client 102.

Responsive to the command to execute the method to simulate the contract transaction, the endorsing node 105b executes the method to simulate the contract transaction.

One or more embodiments receive a command to execute a method to simulate an adapter transaction (Operation 304). The endorsing node 105b receives a command to execute a method to simulate an adapter transaction. The command may specify parameters for the method. The parameters may include information associated with the adapter transaction. The method includes operations for determining a state, to be written into a blockchain ledger, based on the adapter transaction. The method may be defined by a blockchain-side adapter. The command to simulate the adapter transaction constitutes a proposal of the adapter transaction. The adapter transaction may be proposed in response to an invocation and/or execution of the method defined by the smart contract, which is discussed above with reference to Operation 302. Various ways of receiving the command to execute the method defined by the blockchain-side adapter may be used.

In an embodiment, the method to simulate the contract transaction includes a command to invoke a method to simulate an adapter transaction. The command includes (a) an identifier of the method to simulate the adapter transaction and (b) parameters for the method to simulate the adapter transaction. When the endorsing node 105b executes the method to simulate the contract transaction, the endorsing node 105b also invokes the method to simulate the adapter transaction.

In another embodiment, a monitoring service may monitor the methods that are invoked and/or executed. Based on the invocation and/or execution of the method to simulate the contract transaction, the monitoring service may invoke the method to simulate the adapter transaction.

Responsive to the command to execute the method to simulate the adapter transaction, the endorsing node 105b executes the method to simulate the adapter transaction.

One or more embodiments verify whether the adapter transaction includes a set of information associated with an application (Operation 306). The endorsing node 105b executes the method to simulate the adapter transaction. The method to simulate the adapter transaction includes operations for verifying whether the adapter transaction includes a set of information associated with a particular application that is to be synchronized with the blockchain ledger.

As part of execution of the method to simulate the adapter transaction, the endorsing node 105b verifies whether the adapter transaction includes a set of information associated with the particular application. Various ways of verifying the adapter transaction may be used.

The adapter transaction is verified based on whether the adapter transaction includes sufficient information to determine values for fields and/or attributes used by a particular application. As an example, an application may maintain a database of books, including the fields "Title" and "Author." An endorsing node may execute a method to verify that an adapter transaction includes information specifying values for "Title" and "Author." If an adapter transaction includes information only for "Title," but not "Author," then the verification may fail.

Additionally or alternatively, the adapter transaction is based on whether the adapter transaction includes information that is valid for use by a particular application. As an example, an application may maintain a database of books. The application may store the titles of the books in English. Titles in foreign languages may be invalid. An endorsing node may execute a method to verify whether an adapter transaction includes information for determining an English title of a book. If the adapter transaction includes information for determining a title in a foreign language, but not in English, then the verification may fail.

If the adapter transaction does not include a set of information associated with an application, one or more embodiments generate an error (Operation 308). The endorsing node 105b may transmit an error message to the client 102. The endorsing node 105b does not determine a state, to be written to the blockchain ledger, based on the adapter transaction. The endorsing node 105b does not transmit any endorsement of the adapter transaction. Additionally, the endorsing node 105b does not transmit any endorsement of the contract transaction.

One or more embodiments determine a first state based on the contract transaction and a second state based on the adapter transaction (Operation 310). Based on the execution of the method to simulate the contract transaction, the endorsing node 105b determines a first state based on the contract transaction. Both states are to be written to the blockchain ledger. Based on the execution of the method to simulate the adapter transaction, the endorsing node 105b determines a second state based on the adapter transaction. The second state is to be used for updating the application that is to be synchronized with the blockchain ledger.

One or more embodiments transmit, to the client, an endorsement of the contract transaction and the adapter transaction, wherein the endorsement includes the first state and the second state (Operation 312). The endorsing node 105b generates a message that includes the first state and the second state. The message may also include the contract transaction and the adapter transaction. The message may also include (a) a current state, before the simulation of the contract transaction, and (b) a current state, before the simulation of the adapter transaction. The endorsing node 105b signs the message. The endorsing node 105b transmits the message to the client 102. The message constitutes an endorsement of the contract transaction and the adapter transaction.

Figure 4:
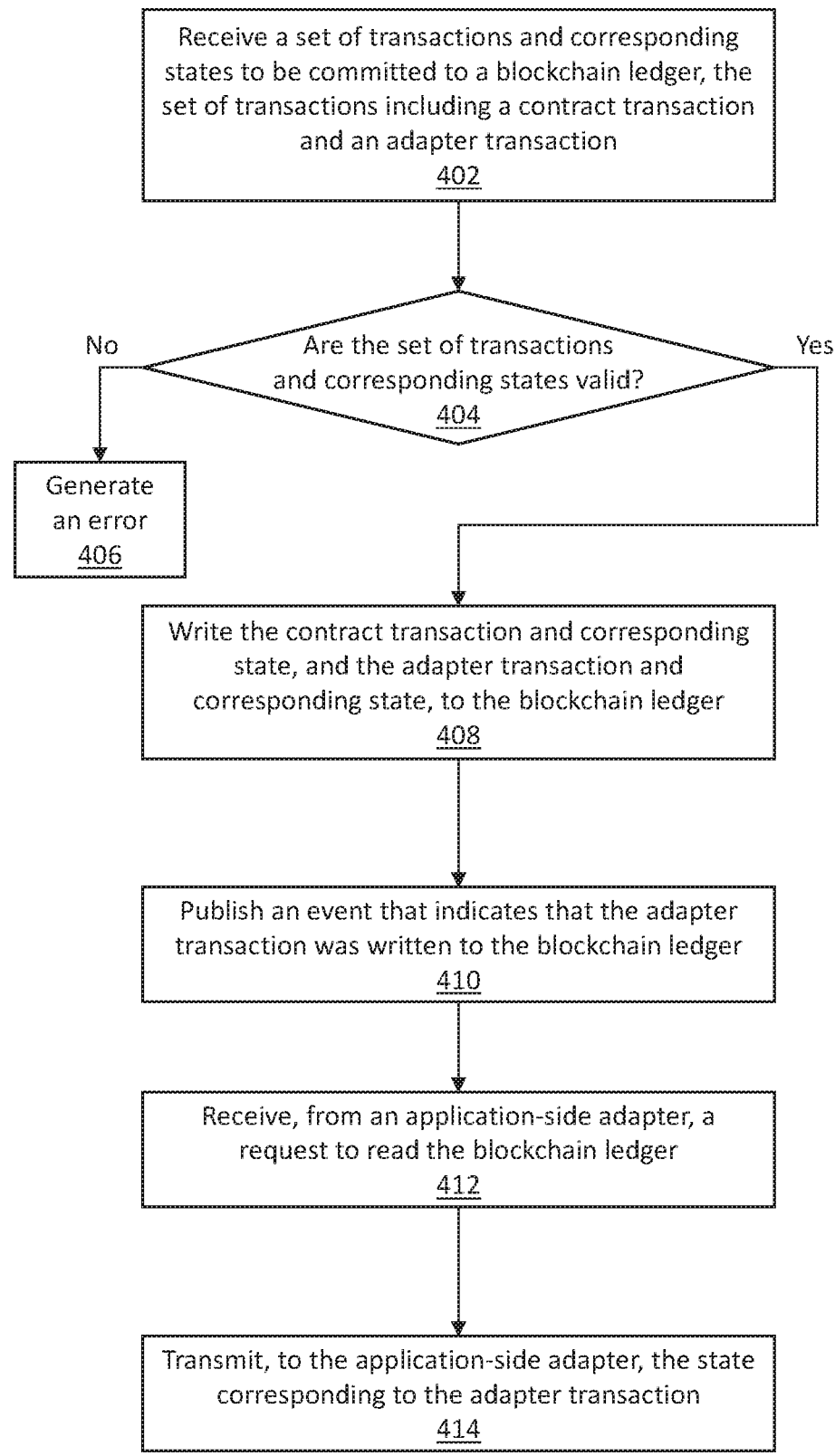
FIG. 4 illustrates an example set of operations for committing a transaction to be written to a blockchain ledger and integrated with an application, in accordance with one or more embodiments.

5. Committing a Transaction to be Written to a Blockchain Ledger and Integrated with an Application FIG. 4 illustrates an example set of operations for committing a transaction to be written to a blockchain ledger and integrated with an application. One or more operations illustrated in FIG. 4 may be modified, rearranged, or omitted all together. Accordingly, the particular sequence of operations illustrated in FIG. 4 should not be construed as limiting the scope of one or more embodiments. The operations of FIG. 4 may be performed by each of a set of nodes 104a-e that maintain a blockchain ledger.

One or more embodiments receive a set of transactions and corresponding states to be committed to a blockchain ledger, the set of transactions including a contract transaction and an adapter transaction (Operation 402). A node 104a receives a set of transactions and corresponding states to be committed to a blockchain ledger. The set of transactions includes a contract transaction. The contract transaction may be simulated based on a method defined by a smart contract. The set of transactions includes an adapter transaction. The adapter transaction may be simulated based on a method defined by a blockchain-side adapter.

The node 104a receives the set of transactions as a block from an ordering service 106. The block includes the set of transactions as well as (a) a hash of a preceding block, generated by the ordering service 106, and (b) a hash of the block itself.

One or more embodiments determine whether the set of transactions and corresponding states are valid (Operation 404). The node 104a determines whether the set of transactions and corresponding states are valid.

In an embodiment, the node 104a determines whether each transaction is associated with a sufficient number of endorsements. The number of endorsements required for the contract transaction may be specified by the smart contract that includes the method for simulating the contract transaction. The number of endorsements required for the adapter transaction may be specified by the blockchain-side adapter that includes the method for simulating the adapter transaction.

In an embodiment, the node 104a verifies whether each endorsement is properly signed by an endorsing node 105b. A particular set of endorsing nodes required for the contract transaction may be specified by the smart contract that includes the method for simulating the contract transaction. A particular set of endorsing nodes required for the adapter transaction may be specified by the blockchain-side adapter that includes the method for simulating the adapter transaction.

In an embodiment, the node 104a verifies whether any state, in the blockchain ledger, has changed since the simulation and/or endorsement of each transaction. The node 104a may verify whether a state associated with the smart contract has changed since the simulation and/or endorsement of the contract transaction. The node 104a may verify whether a state associated with the blockchain-side adapter has changed since the simulation and/or endorsement of the adapter transaction.

As described above, an endorsement may include both (a) the new state determined based on the contract transaction and (b) a state prior to the simulation of the contract transaction. The node 104a determines a current state, associated with the smart contract, at the time of commitment. The node 104a determines whether the states are the same by comparing (a) the current state at the time of commitment and (b) the state prior to the simulation of the contract transaction. In an embodiment, since each state is associated with a version number, the node 104a may determine whether the states are the same by comparing only (a) the version number associated with the current state and (b) the version number associated with the state prior to the simulation of the contract transaction.

As described above, an endorsement may include both (a) the new state determined based on the adapter transaction and (b) a state prior to the simulation of the adapter transaction. The node 104a determines a current state, associated with the blockchain-side adapter, at the time of commitment. The node 104a determines whether the states are the same by comparing (a) the current state at the time of commitment and (b) the state prior to the simulation of the adapter transaction. In an embodiment, since each state is associated with a version number, the node 104a may determine whether the states are the same by comparing only (a) the version number associated with the current state and (b) the version number associated with the state prior to the simulation of the adapter transaction.

In an embodiment, the node 104a verifies whether the contract transaction is accompanied with a corresponding adapter transaction. The smart contract that includes the method for simulating the contract transaction may require this verification at the time of commitment. Responsive to determining that the set of transactions to be committed includes the contract transaction, the node 104a determines whether the set of transactions to be committed also includes an adapter transaction. The node 104a determines whether the adapter transaction was invoked based on the contract transaction. If the set of transactions includes an adapter transaction that was invoked based on the contract transaction, then the verification succeeds. If the set of transactions does not include an adapter transaction that was invoked based on the contract transaction, then the verification fails.

If the set of transactions and corresponding states are not valid, one or more embodiments generate an error (Operation 406). If any verifications fail, then the node 104a may transmit an error message to the client 102. The node 104a does not write any of the transactions or corresponding states, received at Operation 402, to the blockchain ledger.

One or more embodiments write the contract transaction and corresponding state, and the adapter transaction and corresponding state, to the blockchain ledger (Operation 408). The node 104a writes the set of transactions, including the contract transaction and the adapter transaction, to the blockchain ledger. In an embodiment, the set of transaction is received as a block that includes the necessary hashes. The node 104a adds the block to a blockchain log in the blockchain ledger.

The node 104a writes the states corresponding to the transactions to the blockchain ledger. The node 104a may add the states to a record of states in the blockchain ledger. Additionally or alternatively, the node 104a may overwrite existing states in the record of states with the states received at Operation 402.

In an embodiment, writing the state corresponding to the adapter transaction includes assigning a status associated with the state. Various values may be assigned to the status associated with a state of a blockchain-side adapter, such as "Not Yet Read," "Successfully Read," "Unsuccessfully Read," "Successfully Updated Application," "Unsuccessfully Updated Application." When the node 104a updates a state, in the blockchain ledger, based on an adapter transaction, the node 104a assigns the status "Not Yet Read." The node 104a updates the state, in the blockchain ledger, to indicate that the associated status is "Not Yet Read."

One or more embodiments publish an event that indicates that the adapter transaction was written to the ledger (Operation 410). The node 104a publishes an event that indicates that the adapter transaction was written to the blockchain ledger. The event is published to an event stream. Publication of an event may be triggered by various factors, such as, the commitment of a block to the blockchain log, the commitment of a transaction of a certain transaction type, the commitment of a threshold number of transactions, and/or the passage of a threshold time interval. The event may be a message stating that a new block was committed to the blockchain log, that a transaction of a certain transaction type was committed, that a threshold number of transactions were committed, and/or that a threshold time interval has passed. Additionally or alternatively, the event may be a message that specifically states that the adapter transaction was written to the blockchain ledger.

One or more of the nodes 104a-e may each manage a separate event stream. One or more of the nodes 104a-e may publish an event indicating that the adapter transaction was written to the blockchain ledger on the corresponding event stream.

As further described below with reference to Operation 502 of FIG. 5, an application-side adapter 108 is subscribed to the event stream of the node 104a. The application-side adapter 108 obtains the event via the event stream.

Other ways of notifying the application-side adapter 108 that the adapter transaction was written to the blockchain ledger may be used. For example, the node 104a may directly transmit a notification to the application-side adapter 108.

One or more embodiments receive, from an application-side adapter, a request to read the blockchain ledger (Operation 412).

As further described below with reference to Operation 504 of FIG. 5, responsive to obtaining the event, the application-side adapter 108 transmits a request to read the blockchain ledger.

The node 104a receives the request to read the blockchain ledger from the application-side adapter 108. The node receiving the request to read the blockchain ledger may be the same as or different from the node that published the event at Operation 410.

One or more embodiments transmit, to the application-side adapter, the state corresponding to the adapter transaction (Operation 414). Responsive to the request to read the blockchain ledger, the node 104a transmits at least a subset of states from the blockchain ledger. The transmitted states include at least the second state determined based on the adapter transaction. The second state determined based on the adapter transaction may be used to update the application that is to be synchronized with the blockchain ledger.

6. Updating an Application Using Information from a Blockchain Ledger

Figure 5:
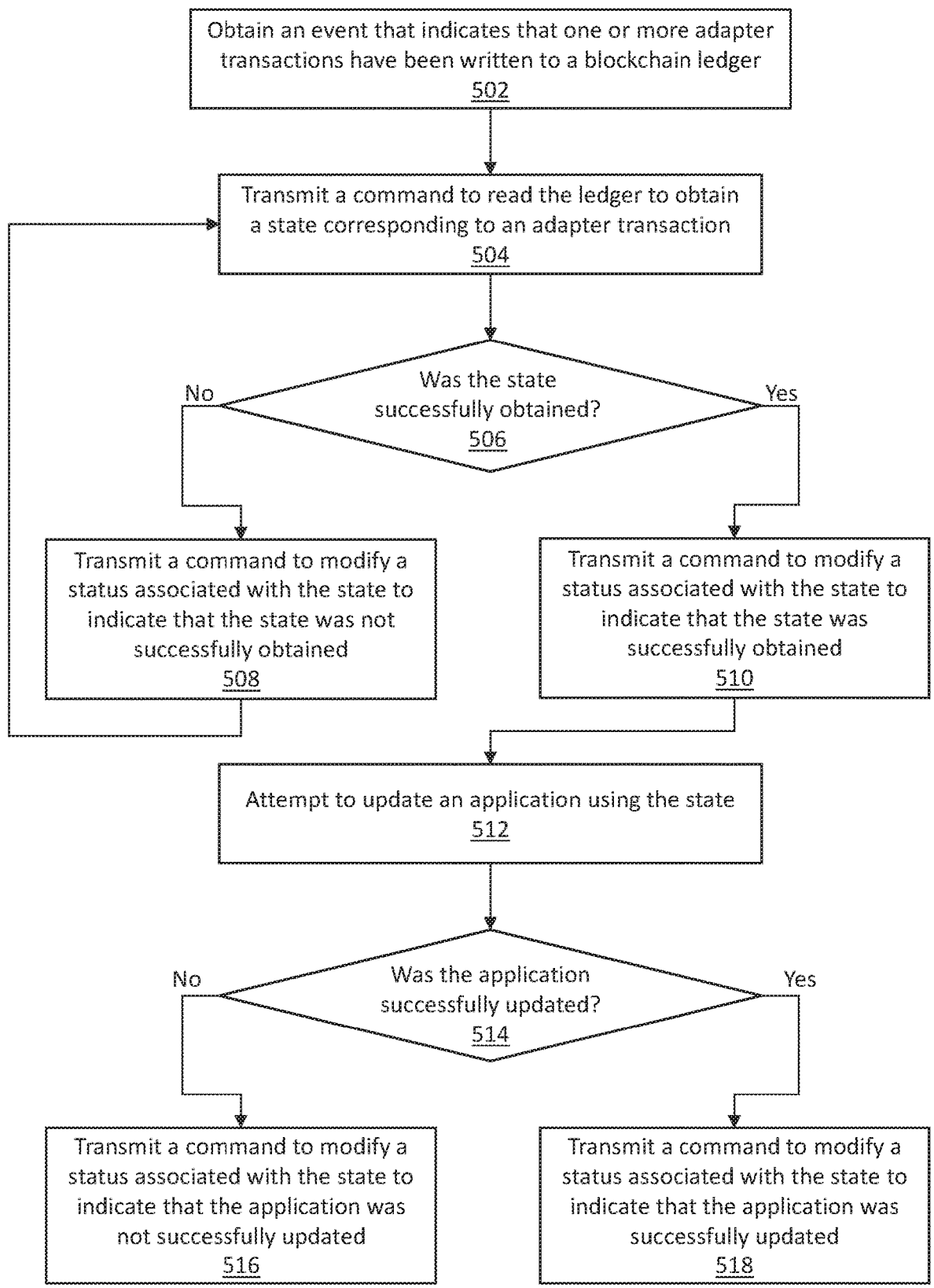
FIG. 5 illustrates an example set of operations for updating an application using information from a blockchain ledger, in accordance with one or more embodiments.

FIG. 5 illustrates an example set of operations for updating an application using information from a blockchain ledger. One or more operations illustrated in FIG. 5 may be modified, rearranged, or omitted all together. Accordingly, the particular sequence of operations illustrated in FIG. 5 should not be construed as limiting the scope of one or more embodiments. The operations of FIG. 5 may be performed by an application-side adapter 108 and/or any of applications 110a-b.

One or more embodiments obtain an event that indicates that one or more adapter transactions have been written to a blockchain ledger (Operation 502). An application-side adapter 108 obtains an event that indicates that one or more adapter transactions have been written to a blockchain ledger. The application-side adapter 108 may obtain the event via subscription to an event stream of a node 104a.

As described above with reference to Operation 410 of FIG. 4, one or more of the set of nodes 104a-e that maintains the blockchain ledger may manage a separate event stream. The application-side adapter 108 may subscribe to the event streams of all the nodes 104a-e. However since the blockchain ledger is the same for all nodes 104a-e, subscription to an event stream of a single node 104a is sufficient.

One or more embodiments transmit a command to read the ledger to obtain a state corresponding to an adapter transaction (Operation 504). Responsive to obtaining the event, the application-side adapter 108 transmits a request to read the blockchain ledger. The request may be a request to read all or a subset of the blockchain ledger. The request may be a request to specifically read one or more adapter transactions.

The application-side adapter 108 may transmit the request to read the blockchain ledger to the same node 104a from which the application-side adapter 108 obtained the event at Operation 502. Additionally or alternatively, the application-side adapter 108 may transmit the request to read the blockchain ledger to a different node that maintains the blockchain ledger.

One or more embodiments determine whether the state was successfully obtained (Operation 506). The application-side adapter 108 determines whether the state, corresponding to the adapter transaction, was successfully obtained in response to the request to read the blockchain ledger.

If the state was not successfully obtained, one or more embodiments transmit a command to modify a status associated with the state to indicate that the state was not successfully obtained (Operation 510). The application-side adapter 108 transmits a command to modify a status associated with the state to indicate that the state was not successfully obtained. The application-side adapter 108 transmits the command to one or more endorsing nodes 105b. The endorsing nodes 105b for the command to modify a status may be the same as or different than the endorsing nodes for the command to execute the method to simulate an adapter transaction, as described above with reference to Operation 304 of FIG. 3. The command to modify the status constitutes a proposal of a transaction that modifies a status associated with a state.

As an example, an advertising application may produce advertisements for cars. A particular state, in a blockchain ledger, that was updated based on an adapter transaction may be associated with the status, "Not Yet Read." An application-side adapter may transmit a request to read the blockchain ledger. The application-side adapter may successful obtain the particular state. The application-side adapter may transmit a command to modify the status associated with the particular status to be, "Successfully Read." The command may include (a) an identifier of a method that modifies a status associated with a state, and (b) parameters for the method. Parameters of the method may indicate that the status to be assigned is "Successfully Read." The application-side adapter may transmit the command to a set of endorsing nodes.

The proposal of the transaction to modify a status associated with a state triggers a set of operations for committing the transaction. The endorsing nodes 105b endorse the transaction to modify the status. Endorsement may be conditioned upon a determination that the transition from a current status to the proposed status is valid. What transitions are considered "valid" may be determined based on a state machine. For example, transitioning from "Not Yet Read" to "Successfully Read" is valid; transitioning from "Successfully Read" to "Successfully Updated Application" is valid; transitioning from "Unsuccessfully Read" to "Successfully Read" is valid. For example, transitioning from "Unsuccessfully Read" to "Not Yet Read" is not valid; transitioning from "Unsuccessfully Updated Application" to "Unsuccessfully Read" is not valid.

Responsive to receiving the endorsements, the application-side adapter 108 transmits the endorsements to the ordering service 106. The ordering service 106 delivers transactions to be committed, including the transaction to modify the status. The set of nodes 105a commit the transactions, including the transaction to modify the status.

In an embodiment, the command to read the blockchain ledger of Operation 504 and the command to modify a status associated a state in the blockchain ledger of Operation 510 are combined into one command. The combined command includes both a command to read the blockchain ledger and a command to modify statuses associated with the states that are read. The status to be assigned, based on the command, may be: "Requested to Be Read."

If the state was successfully obtained, one or more embodiments transmit a command to modify a status associated with the state to indicate that the state was successfully obtained (Operation 512). The application-side adapter 108 transmits a command to modify a status associated with the state to indicate that the state was successfully obtained. Embodiments and examples relating to transmitting a command to modify a status associated with a state are described above with reference to Operation 510.

One or more embodiments attempt to update an application using the state (Operation 514). The application-side adapter 108 transmits the state to one or more applications 110a-b. An application (such as any of applications 110a-b) updates one or more databases associated with the application based on the state. Additionally or alternatively, the application updates one or more functionalities associated with the application based on the state.

As an example, a cloud application may maintain contacts information for a group of salespersons. Each salesperson may have access to the information of only the contacts associated with the salesperson. The cloud application may assigns security settings to the user accounts of the salespersons. In particular, the cloud application may assign the security setting, "Access to Los Angeles contacts only" to a user account of Salesperson Joe. Based on the security setting, the functionality of the cloud application may allow Joe to access Los Angeles contacts only.

A blockchain ledger may maintain information about which department each salesperson is assigned to. A contract transaction may be performed to transfer Salesperson Joe from the "Los Angeles Sales Department" to the "Southern California Sales Department." The contract transaction may update a state in the blockchain ledger to indicate that Salesperson Joe is now in the "Southern California Sales Department." A corresponding adapter transaction may be performed. The adapter transaction may update a state in the blockchain ledger to indicate updated information to be synchronized with the cloud application. The updated information may indicate that Salesperson Joe is now in the "Southern California Sales Department."

An application-side adapter obtains the state determined based on the adapter transaction, which indicates that Salesperson Joe is now in the "Southern California Sales Department." Based on the obtained state, the cloud application changes a security setting assigned to the user account of Salesperson Joe to "Southern California contacts only." Based on the new security setting, the functionality of the cloud application may be modified to allow Joe to access Southern California contacts.

In an embodiment, the application-side adapter 108 is authorized to perform updates on the applications 110*a-b*. The application-side adapter 108 may update databases and/or functionalities of the applications 110*a-b* based on the states.

One or more embodiments determine whether the application was successfully updated (Operation 516). The application-side adapter 108 determines whether the application was successfully updated. The application-side adapter 108 may determine whether the update was successfully based on messages transmitted from the application. As an example, an application-side adapter may receive an error from the application indicating that the update was not successful. As another example, an application-side adapter may receive an acknowledgement from the application indicating that the update was successful. As another example, an application-side adapter may receive a message from the application indicating that the application is executing as expected. The message may indicate that the update was successful.

If the application was not successfully updated, one or more embodiments transmit a command to modify a status associated with the state to indicate that the application was not successfully updated (Operation 518). The application-side adapter 108 transmits a command to modify a status associated with the state to indicate that the application was not successfully updated. Embodiments and examples relating to transmitting a command to modify a status associated with a state are described above with reference to Operation 510.

If the application was successfully updated, one or more embodiments transmit a command to modify a status associated with the state to indicate that the application was successfully updated (Operation 520). The application-side adapter 108 transmits a command to modify a status associated with the state to indicate that the application was successfully updated. Embodiments and examples relating to transmitting a command to modify a status associated with a state are described above with reference to Operation 510.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
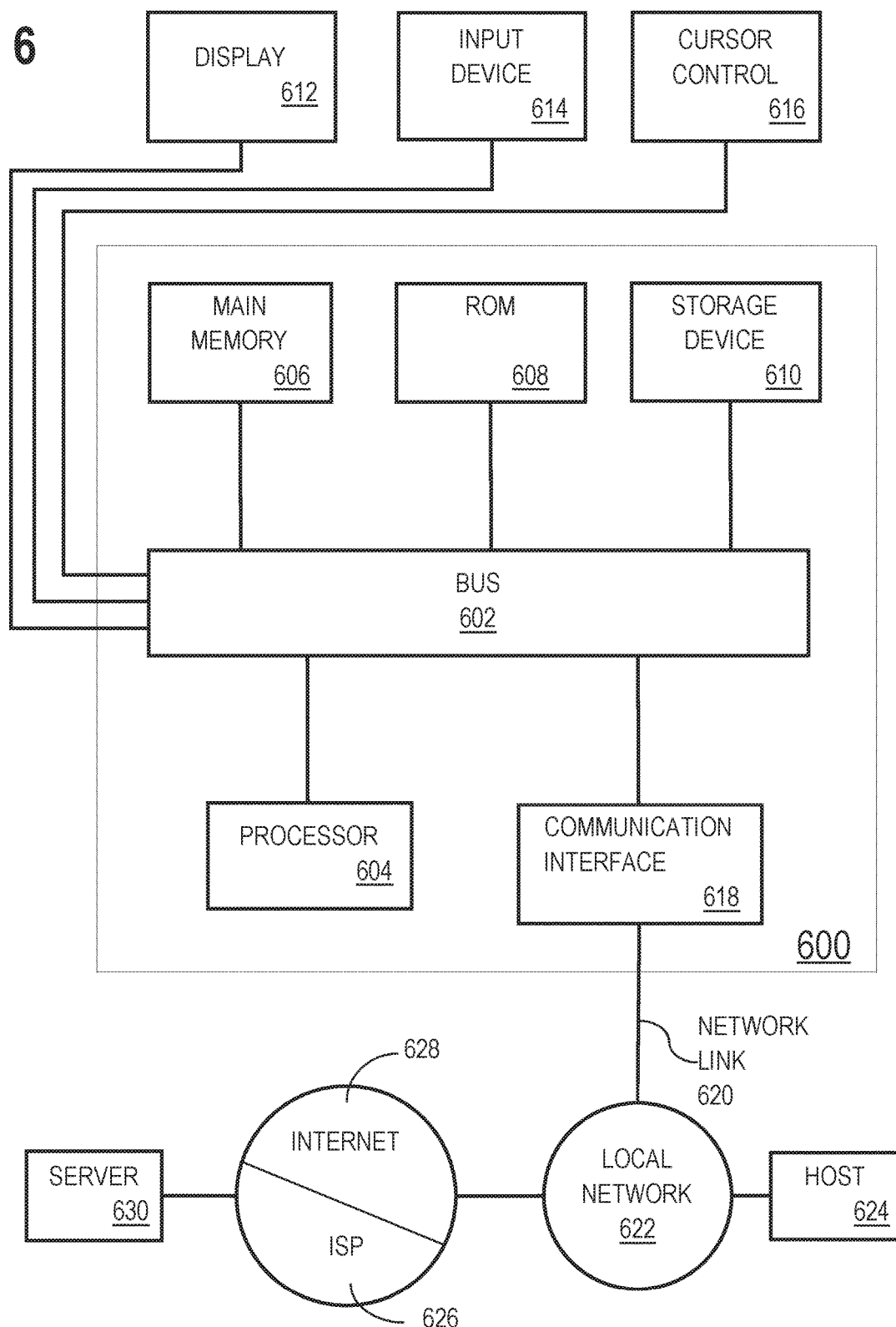
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors of a first node of a plurality of nodes, cause the one or more hardware processors to perform operations comprising:
receiving a first command to invoke a first method using a first set of one or more parameters;
responsive at least to receiving the first command to invoke the first method: invoking the first method using the first set of parameters;
responsive at least to invoking the first method:
determining a first state at least by executing the first method using the first set of parameters;
invoking a second method using a second set of one or more parameters;
responsive at least to invoking the second method:
determining, by a blockchain-side adapter on the first node, a second state at least by executing the second method using the second set of parameters;
determining, by the blockchain-side adapter on the first node, one or more of: (a) whether a value for a field or attribute used by a first application is determinable using the second set of parameters, and (b) whether the value, for the field or attribute used by the first application, determined using the second set of parameters is valid for the first application;
responsive at least to determining one or more of: (a) the value for the field or attribute used by the first application is determinable using the second set of parameters, and (b) the value, for the field or attribute used by the first application, determined using the second set of parameters is valid for the first application: generating a first endorsement for the plurality of nodes to write the first state and the second state to a blockchain ledger;
writing the first state and the second state to a copy of the blockchain ledger that is stored on the first node.

2. The media of claim 1, wherein the operations further comprise:
receiving, from the first application, a command to read the blockchain ledger;
responsive to receiving the command to read the blockchain ledger: transmitting, to the first application, the second state.

3. The media of claim 2, wherein the operations further comprise:
subsequent to transmitting, to the first application, the second state:
writing, to the copy of the blockchain ledger that is stored on the first node, a status associated with the second state indicating that the second state was transmitted to the first application.

4. The media of claim 1, wherein the operations further comprise:
generating a message indicating that the blockchain ledger is written with a set of one or more states, wherein the set of one or more states includes the second state.

5. The media of claim 1, wherein the operations further comprise:
updating the first application using the second state.

6. The media of claim 1, wherein the first method includes a set of code that invokes the second method.

7. The media of claim 1, wherein determining whether the value for the field or attribute used by the first application is determinable using the second set of parameters comprises determining whether the value for the field or attribute used by the first application is included in the second set of parameters.

8. The media of claim 1, wherein determining whether the value, for the field or attribute used by the first application, determined using the second set of parameters is valid for the first application comprises determining whether the value is of a particular language.

9. The media of claim 1, wherein the first endorsement comprises:
a plurality of states, including the first state and the second state; and
a signature of the first node.

10. The media of claim 1, wherein the operations further comprise:
receiving a second command to invoke a third method using a third set of one or more parameters;
responsive at least to receiving the second command to invoke the third method: invoking the third method using the third set of parameters;
responsive at least to invoking the third method:
determining a third state at least by executing the third method using the third set of parameters;
invoking the second method using a fourth set of one or more parameters;
responsive at least to invoking the second method:
determining, by the blockchain-side adapter, a fourth state at least by executing the second method using the fourth set of parameters;
determining, by the blockchain-side adapter, one or more of: (a) whether a second value for a second field or attribute used by the first application is determinable using the fourth set of parameters, and (b) whether the second value, for the second field or attribute used by the first application, determined using the fourth set of parameters, is valid for the first application;
responsive at least to determining one or more of: (a) the second value for the second field or attribute used by the first application is determinable using the fourth set of parameters, and (b) the second value, for the second field or attribute used by the first application, determined using the fourth set of parameters, is valid for the first application: generating a second endorsement for the plurality of nodes to write the third state and the fourth state to the blockchain ledger;
writing the third state and the fourth state to the copy of the blockchain ledger that is stored on the first node.

11. The media of claim 1, wherein the operations further comprise:
further responsive to invoking the second method: determining, by the blockchain-side adapter, one or more of: (a) whether a second value for a second field or attribute used by a second application is determinable using the second set of parameters, and (b) whether the second value, for the second field or attribute used by the second application, determined using the second set of parameters is valid for the second application;
wherein the first application and the second application are different.

12. The media of claim 1, wherein the operations further comprise:
generating a message indicating that the blockchain ledger is written with a set of one or more states, wherein the set of one or more states includes the second state;
receiving, from the first application, a command to read the blockchain ledger;
transmitting, to the first application, the second state;
writing, to the copy of the blockchain ledger that is stored on the first node, a status associated with the second state indicating that the second state was obtained;
updating the first application using the second state;
receiving a second command to invoke a third method using a third set of one or more parameters;
wherein the first method and the third method are different;
responsive at least to receiving the second command to invoke the third method: invoking the third method using the third set of parameters;
responsive at least to invoking the third method:
determining a third state at least by executing the third method using the third set of parameters;
invoking the second method using a fourth set of one or more parameters;
responsive at least to invoking the second method:
determining, by the blockchain-side adapter, a fourth state at least by executing the second method using the fourth set of parameters;
determining, by the blockchain-side adapter, one or more of: (a) whether a second value for a second field or attribute used by the first application is determinable using the fourth set of parameters, and (b) whether the second value, for the second field or attribute used by the first application, determined using the fourth set of parameters, is valid for the first application;

responsive at least to determining one or more of: (a) the second value for the second field or attribute used by the first application is determinable using the fourth set of parameters, and (b) the second value, for the second field or attribute used by the first application, determined using the fourth set of parameters, is valid for the first application: generating a second endorsement for the plurality of nodes to write the third state and the fourth state to the blockchain ledger;

writing the third state and the fourth state to the copy of the blockchain ledger that is stored on the first node.

13. A method, comprising:

receiving, by a first node of a plurality of nodes, a first command to invoke a first method using a first set of one or more parameters;

responsive at least to receiving the first command to invoke the first method: invoking the first method using the first set of parameters;

responsive at least to invoking the first method:
  determining a first state at least by executing the first method using the first set of parameters;
  invoking a second method using a second set of one or more parameters;

responsive at least to invoking the second method:
  determining, by a blockchain-side adapter on the first node, a second state at least by executing the second method using the second set of parameters;
  determining, by the blockchain-side adapter on the first node, one or more of: (a) whether a value for a field or attribute used by a first application is determinable using the second set of parameters, and (b) whether the value, for the field or attribute used by the first application, determined using the second set of parameters is valid for the first application;

responsive at least to determining one or more of: (a) the value for the field or attribute used by the first application is determinable using the second set of parameters, and (b) the value, for the field or attribute used by the first application, determined using the second set of parameters is valid for the first application: generating, by the first node, a first endorsement for the plurality of nodes to write the first state and the second state to a blockchain ledger;

writing, by the first node, the first state and the second state to a copy of the blockchain ledger that is stored on the first node;

wherein the method is performed by at least one device including a hardware processor.

14. A system, comprising:

at least a first node including a hardware processor;

one or more non-transitory computer readable media comprising instructions which, when executed by at least the hardware processor, causes at least the hardware processor to perform operations comprising:

receiving, by the first node of a plurality of nodes, a first command to invoke a first method using a first set of one or more parameters;

responsive at least to receiving the first command to invoke the first method: invoking the first method using the first set of parameters;

responsive at least to invoking the first method:
  determining a first state at least by executing the first method using the first set of parameters;
  invoking a second method using a second set of one or more parameters;

responsive at least to invoking the second method:
  determining, by a blockchain-side adapter on the first node, a second state at least by executing the second method using the second set of parameters;
  determining, by the blockchain-side adapter on the first node, one or more of: (a) whether a value for a field or attribute used by a first application is determinable using the second set of parameters, and (b) whether the value, for the field or attribute used by the first application, determined using the second set of parameters is valid for the first application;

responsive at least to determining one or more of: (a) the value for the field or attribute used by the first application is determinable using the second set of parameters, and (b) the value, for the field or attribute used by the first application, determined using the second set of parameters is valid for the first application: generating, by the first node, a first endorsement for the plurality of nodes to write the first state and the second state to a blockchain ledger;

writing, by the first node, the first state and the second state to a copy of the blockchain ledger that is stored on the first node.

15. The one or more media of claim 1, wherein:

executing a first set of one or more methods, including the first method, simulates a first transaction that results in the first state;

executing a second set of one or more methods, including the second method, simulates a second transaction that (i) results in the second state and (ii) determines one or more of: (a) whether the value for the field or attribute used by the first application is determinable using the second set of parameters, and (b) whether the value, for the field or attribute used by the first application, determined using the second set of parameters is valid for the first application;

wherein the first set of one or more methods and the second set of one or more methods are different.

16. The one or more media of claim 15, wherein one of the first set of one or more methods invokes one of the second set of one or more methods.

17. The one or more media of claim 1, wherein executing a first set of one or more methods, including the first method, simulates a first transaction that results in the first state, and proposes a second transaction that results in the second state.

18. The one or more media of claim 1, wherein the first method is associated with a first smart contract, and the second method is associated with a second smart contract different from the first smart contract.

19. The one or more media of claim 18, wherein:

the first state is written into a first set of states stored on the blockchain ledger in association with the first smart contract; and the second state is written into a second set of states stored on the blockchain ledger in association with the second smart contract.

20. The one or more media of claim 1, wherein the operations further comprise:

receiving a second command to invoke a third method using a third set of one or more parameters;

responsive at least to receiving the second command to invoke the third method: invoking the third method;

responsive at least to invoking the third method:
  determining a third state at least by executing the third method using the third set of parameters;

invoking the second method using a fourth set of one or more parameters;

responsive at least to invoking the second method:
   determining one or more of: (a) whether a second value for a second field or attribute used by the first application is determinable using the fourth set of parameters, and (b) whether the second value, for the second field or attribute used by the first application, determined using the fourth set of parameters, is valid for the first application;

responsive at least to determining one or more of: (a) the second value for the second field or attribute used by the first application is not determinable using the fourth set of parameters, and (b) the second value, for the second field or attribute used by the first application, determined using the fourth set of parameters, is not valid for the first application: refraining from generating any endorsement for the plurality of nodes to write the third state to the blockchain ledger in response to the second command to invoke the third method.

21. The one or more media of claim 1, wherein the first application is not executed on the one or more hardware processors.

22. The one or more media of claim 1, wherein the operations further comprise:
   receiving a plurality of endorsements for the plurality of nodes to write the first state and the second state to the blockchain ledger, the plurality of endorsements including the first endorsement;
   determining whether the plurality of endorsements are associated with proper signatures;
   wherein writing the first state and the second state to the copy of the blockchain ledger is responsive at least to verifying that the plurality of endorsements are associated with the proper signatures.

23. The one or more media of claim 1, wherein the operations further comprise:
   determining that the first state can be validly integrated with the first application responsive to determining one or more of: (a) the value for the field or attribute used by the first application is determinable using the second set of parameters, and (b) the value, for the field or attribute used by the first application, determined using the second set of parameters is valid for the first application.

* * * * *